US012132989B2

(12) United States Patent
Ji et al.

(10) Patent No.: US 12,132,989 B2
(45) Date of Patent: Oct. 29, 2024

(54) STABILIZATION ASSEMBLY FOR IMAGE SENSOR

(71) Applicant: Google LLC, Mountain View, CA (US)

(72) Inventors: Suyao Ji, Mountain View, CA (US); Lu Gao, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/789,677

(22) PCT Filed: Aug. 19, 2021

(86) PCT No.: PCT/US2021/046663
§ 371 (c)(1),
(2) Date: Feb. 23, 2023

(87) PCT Pub. No.: WO2023/022718
PCT Pub. Date: Feb. 23, 2023

(65) Prior Publication Data
US 2024/0171859 A1     May 23, 2024

(51) Int. Cl.
*H04N 23/68*     (2023.01)
*H04N 23/40*     (2023.01)
*H04N 23/51*     (2023.01)
*H04N 23/54*     (2023.01)

(52) U.S. Cl.
CPC ........... *H04N 23/687* (2023.01); *H04N 23/40* (2023.01); *H04N 23/51* (2023.01); *H04N 23/54* (2023.01)

(58) Field of Classification Search
CPC ...... H04N 23/687; H04N 23/40; H04N 23/51; H04N 23/54; H04N 23/55; H04N 23/57
See application file for complete search history.

(56) References Cited

U.S. PATENT DOCUMENTS 9,332,187 B2 *   5/2016   Oh ................. G03B 2205/0007
10,122,923 B2    11/2018   Jung et al.
10,353,217 B2    7/2019   Yeo
10,447,931 B2 *   10/2019   Hu ......................... H04N 23/57
(Continued)

OTHER PUBLICATIONS

International Search Report and Written Opinion in International Appln. No. PCT/US2021/046663, mailed on Apr. 22, 2022, 13 pages.
(Continued)

*Primary Examiner* — Padma Haliyur
(74) *Attorney, Agent, or Firm* — Fish & Richardson P.C.

(57) ABSTRACT

A sensor-stabilization assembly includes: a housing including a first portion of a first electromagnetic assembly and of a second electromagnetic assembly and defining a housing aperture; a first frame having first guides that permit relative motion between the first frame and the housing and defining a first frame aperture; and a second frame having second guides that permit relative motion between the second frame and the first frame. The second frame includes: a second portion of the first electromagnetic assembly adapted to interact with the first portion to cause the first frame and second frame to move relative to the housing; and a second portion of the second electromagnetic assembly adapted to interact with the first portion to cause the second frame to move relative to the first frame and housing. A sensor is coupled to the second frame to capture light through the housing aperture and first frame aperture.

20 Claims, 7 Drawing Sheets

(56) References Cited

U.S. PATENT DOCUMENTS

| | | | |
|---|---|---|---|
| 2006/0269263 A1 | 11/2006 | Kim et al. | |
| 2007/0257989 A1 | 11/2007 | Shirono | |
| 2011/0058799 A1* | 3/2011 | Chung | H04N 23/68 |
| | | | 359/557 |
| 2015/0049209 A1* | 2/2015 | Hwang | G02B 7/09 |
| | | | 348/208.11 |
| 2018/0115715 A1* | 4/2018 | Jung | H04N 23/687 |
| 2019/0020822 A1* | 1/2019 | Sharma | G03B 3/10 |
| 2020/0333686 A1 | 10/2020 | Kim | |
| 2020/0351421 A1 | 11/2020 | Park et al. | |
| 2021/0080807 A1* | 3/2021 | Sharma | H04N 23/683 |

OTHER PUBLICATIONS

Notice of Allowance in European Appln. No. 21769284.7, dated Apr. 13, 2023, 8 pages.

International Preliminary Report on Patentability in International Appln. No. PCT/US2021/046663, mailed on Feb. 29, 2024, 8 pages.

* cited by examiner

600

Moving a sensor coupled to a second frame of an assembly in a first direction by energizing a first magnetic assembly to cause both of the second frame and a first frame to move relative to a housing of the assembly along the first direction  602

Moving the sensor in a second direction transverse to the first direction by energizing a second magnetic assembly to cause the second frame to move relative to both of the first frame and the housing along the second direction  604

FIG. 6

STABILIZATION ASSEMBLY FOR IMAGE SENSOR

CROSS-REFERENCE TO RELATED APPLICATION

This application is a National Stage Application under 35 U.S.C. § 371 and claims the benefit of International Application No. PCT/US2021/046663, filed Aug. 19, 2021. The disclosure of the foregoing application is hereby incorporated by reference in its entirety.

TECHNICAL FIELD

This specification relates generally to optical image stabilizers (OIS).

BACKGROUND

Electronic devices can include camera systems. The camera systems can use optical image stabilization techniques to compensate for shaking and vibrations. Optical image stabilization can include moving a lens to counteract unwanted movement of the electronic device. For camera systems with larger and heavier camera lenses, moving the lens is more difficult.

SUMMARY

Disclosed are actuator assemblies for use in stabilizing image sensors. The assemblies can be incorporated in electronic devices that include imaging systems such as camera systems. The disclosed techniques can be used to counteract unwanted motion of the electronic device in order to stabilize video images captured by the image sensor and to improve clarity of captured images. The disclosed techniques stabilize video and images captured by an image sensor by moving the image sensor relative to the housing and the lens.

Optical image stabilization can be achieved by adjusting a relative position between a camera lens and an image sensor in order to counteract movement of the camera, e.g., due to handshaking. Rather than moving the lens relative to the image sensor, the image sensor can be moved relative to the lens in order to compensate for the handshaking. The image sensor can have a lighter weight than the lens. Thus, movement of the image sensor instead of the lens can reduce power consumption, increase moving speed and thus improve stabilization quality, and improve reliability of the camera system.

As additional description to the embodiments described below, the present disclosure describes the following embodiments.

Embodiment 1 is directed to a sensor-stabilization assembly, comprising: a housing that includes a first portion of a first electromagnetic assembly and a first portion of a second electromagnetic assembly, and that defines a housing aperture; a first frame that is movably mounted to an underside of the housing and that has multiple first guides that permit relative motion between the first frame and the housing along a first direction, the first frame defining a first frame aperture; a second frame that is movably mounted to an underside of the first frame and that has multiple second guides that permit relative motion between the second frame and the first frame along a second direction that is transverse to the first direction, wherein: the second frame includes a second portion of the first electromagnetic assembly that is adapted to electromagnetically interact with the first portion of the first electromagnetic assembly when the first electromagnetic assembly is energized to cause both of the first frame and the second frame to move relative to the housing along the first direction; the second frame includes a second portion of the second electromagnetic assembly that is adapted to electromagnetically interact with the first portion of the second electromagnetic assembly when the second electromagnetic assembly is energized to cause the second frame to move relative to both of the first frame and the housing along the second direction; and a sensor coupled to the second frame, the sensor being configured to move in the first and second directions with the second frame and capture light passing through the housing aperture and the first frame aperture.

Embodiment 2 is the assembly of embodiment 1, wherein the underside of the housing defines multiple first troughs oriented along the first direction; and each of the multiple first guides comprises a first protrusion extending from a top side of the first frame into a corresponding first trough of the multiple first troughs defined by the underside of the housing.

Embodiment 3 is the assembly of embodiment 2, wherein the multiple first troughs each define a first wedge shape, and a shape of the first protrusion of each of the multiple first guides conforms with the first wedge shape defined by the corresponding first trough.

Embodiment 4 is the assembly of any one of the embodiments 1 through 3, wherein: the underside of the first frame defines multiple second troughs oriented along the second direction; and each of the multiple second guides comprises a second protrusion extending from a top side of the second frame into a corresponding second trough of the multiple second troughs defined by the underside of the first frame.

Embodiment 5 is the assembly of embodiment 4, wherein the multiple second troughs each define a second wedge shape, and a shape of the second protrusion of each of the multiple second guides conforms with the second wedge shape defined by the corresponding second trough.

Embodiment 6 is the assembly of any one of the embodiments 1 through 5, wherein the multiple first guides prohibit relative motion between the first frame and the housing along the second direction.

Embodiment 7 is the assembly of any one of the embodiments 1 through 6, wherein the multiple second guides prohibit relative motion between the second frame and the first frame along the first direction.

Embodiment 8 is the assembly of any one of the embodiments 1 through 7, wherein an outer perimeter of the first frame forms a first rectangle in a plane defined by the first direction and the second direction; the multiple first guides include four first guides; and each of the four first guides is positioned at a respective corner of four corners of the first rectangle.

Embodiment 9 is the assembly of any one of the embodiments 1 through 8, wherein: an outer perimeter of the second frame forms a second rectangle in a plane defined by the first direction and the second direction; the multiple second guides include four second guides; and each of the four second guides is positioned at a respective corner of four corners of the second rectangle.

Embodiment 10 is the assembly of any one of the embodiments 1 through 9, wherein an outer perimeter of the first frame and an outer perimeter of the second frame have a same size and shape.

Embodiment 11 is the assembly of any one of the embodiments 1 through 10, wherein: the housing aperture is defined by an inner perimeter of the housing; the first frame aperture is defined by an inner perimeter of the first frame; and the inner perimeter of the housing and the inner perimeter of the first frame have a same size and shape.

Embodiment 12 is the assembly of any one of the embodiments 1 through 11, wherein the first portion of the first electromagnetic assembly and the first portion of the second electromagnetic assembly each comprise a magnet; and the second portion of the first electromagnetic assembly and the second portion of the second electromagnetic assembly each comprise a coil.

Embodiment 13 is the assembly of any one of the embodiments 1 through 12, wherein: the first portion of the first electromagnetic assembly is transverse to the first portion of the second electromagnetic assembly; and the second portion of the first electromagnetic assembly is transverse to the second portion of the second electromagnetic assembly.

Embodiment 14 is the assembly of any one of the embodiments 1 through 13, wherein: the housing aperture forms a rectangle in a plane defined by the first direction and the second direction; the first portion of the first electromagnetic assembly and the first portion of the second electromagnetic assembly abut different sides of the housing aperture; an outer perimeter of the second frame forms a rectangle in a plane defined by the first direction and the second direction; and the second portion of the first electromagnetic assembly and the second portion of the second electromagnetic assembly abut different sides of the second frame.

Embodiment 15 is the assembly of any one of the embodiments 1 through 14, wherein each of the multiple first guides and each of the multiple second guides includes a rolling-element bearing.

Embodiment 16 is the assembly of any one of the embodiments 1 through 15, wherein the housing supports an autofocus carrier that moves up and down along the third direction that is transverse to the first direction and the second direction.

Embodiment 17 is the assembly of any one of the embodiments 1 through 16, wherein the assembly is located inside of an electronic device and the housing is nonmoving relative to the electronic device.

Embodiment 18 is the assembly of any one of the embodiments 1 through 17, wherein: the sensor is connected to a fixed circuit board with a flexible conductor to receive electrical signals from the fixed circuit board over the flexible conductor; and the fixed circuit board is fixed with respect to the housing.

Embodiment 19 is the assembly of any one of the embodiments 1 through 18, wherein the sensor comprises an image sensor.

Embodiment 20 is directed to a sensor-stabilization assembly, comprising: a housing that includes a first portion of a first electromagnetic assembly and a first portion of a second electromagnetic assembly, and that defines a housing aperture; a first frame that is movably mounted to an underside of the housing and that has multiple first guides that permit relative motion between the first frame and the housing along a first direction, the first frame defining a first frame aperture; a second frame that is movably mounted to an underside of the first frame and that has multiple second guides that permit relative motion between the second frame and the first frame along a second direction that is transverse to the first direction, wherein: an outer perimeter of the first frame forms a first rectangle in a plane defined by the first direction and the second direction, each of the multiple first guides being positioned at a respective corner of the first rectangle; an outer perimeter of the second frame forms a second rectangle in the plane defined by the first direction and the second direction, each of the multiple second guides being positioned at a respective corner of the second rectangle; the second frame includes a second portion of the first electromagnetic assembly that is adapted to electromagnetically interact with the first portion of the first electromagnetic assembly when the first electromagnetic assembly is energized to cause both of the first frame and the second frame to move relative to the housing along the first direction; the second frame includes a second portion of the second electromagnetic assembly that is adapted to electromagnetically interact with the first portion of the second electromagnetic assembly when the second electromagnetic assembly is energized to cause the second frame to move relative to both of the first frame and the housing along the second direction; and a sensor coupled to the second frame, the sensor being configured to move in the first and second direction with the second frame and capture light passing through the housing aperture and the first frame aperture.

Among other advantages, embodiments feature improved reliability, faster moving speed leading to improved stabilization quality, and reduced power consumption. In some examples, the weight of the moving sensor base is approximately three times lighter than the moving lens carrier. Performing optical image stabilization by adjusting lens position in camera systems with heavy lenses can degrade reliability and increase power consumption. Therefore, reliability, power consumption, resonant frequency, and moving speed can all benefit from the movement of lighter components, e.g., the image sensor, instead of heavier components, e.g., the lens.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 6 shows an example flow diagram of a process for operating a sensor-stabilization assembly.

Like reference symbols in the various drawings indicate like elements.

DETAILED DESCRIPTION

Figure 1:
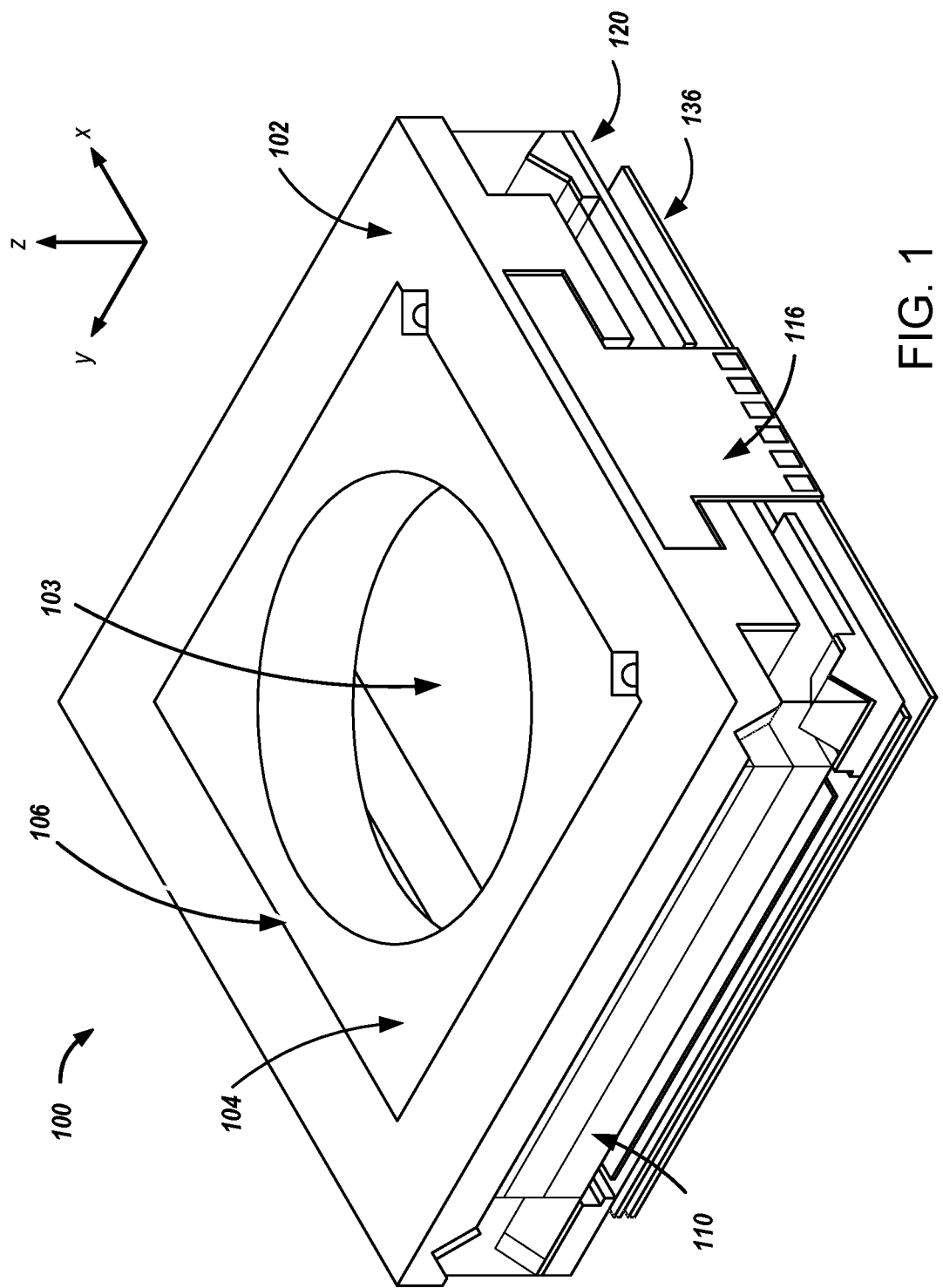
FIG. 1 is a perspective view of an example sensor-stabilization assembly.

FIG. 1 is a perspective view of an example sensor-stabilization assembly. In some examples, the assembly 100 is located inside of an electronic device and the housing 102 is nonmoving relative to the electronic device. In some examples, the assembly 100 is a part of a camera system of an electronic device. The assembly 100 can be used to focus and stabilize an image sensor of the camera system.

A Cartesian coordinate system is shown in FIG. 1 for reference. The Cartesian coordinate system defines a first direction (x-direction), and a second direction (y-direction) that is transverse, e.g., orthogonal or perpendicular, to the first direction. The Cartesian coordinate system also defines a third direction (z-direction) that is transverse, e.g., orthogonal or perpendicular, to both the first direction and the second direction. The x-direction and the y-direction define an x-y plane that is transverse to the z-direction. The x-y plane can be considered any plane that is parallel to both the x-axis and y-axis of the Cartesian coordinate system.

In this disclosure, movement along the z-direction can be movement in the positive or negative z-direction and is referred to as up and down. Movement along the x-direction or the y-direction can be movement in the positive or negative direction, and is referred to as side-to-side. A bottom of the assembly can be defined by a position of a bottom surface of an assembly base 136 in the z-direction. A top of the assembly can be defined by a top surface of the housing 102 opposite from the bottom of the assembly in the z-direction. An underside of a component of the assembly can be defined as a surface of the component that faces towards the assembly base 136 in the z-direction.

The sensor-stabilization assembly 100 includes a housing 102 that supports an autofocus carrier 104. The housing can have an outer perimeter forming a polygonal shape in the x-y plane. For example, the outer perimeter of the housing can have a rectangular shape, a square shape, etc. An example housing has a rectangular shape with each side of the rectangle having a length of 40 millimeters (mm) or less. In some examples, each side of the rectangle can have a length of, e.g., 36 mm or less, 24 mm or less, 12 mm or less, 10 mm or less, etc.

The housing 102 has an inner perimeter that defines a housing aperture 106. The inner perimeter is concentric with the outer perimeter in the x-y plane. In the example assembly 100, the housing aperture 106 forms a rectangular shape in the plane defined by the x-direction and the y-direction. The autofocus carrier 104 defines a carrier aperture 103. In the example assembly 100, the carrier aperture 103 forms a circular shape in the plane defined by the x-direction and the y-direction. The carrier aperture 103 is narrower than the housing aperture 106, e.g., the carrier aperture 103 has a smaller diameter than the diameter of the housing aperture 106. The carrier aperture 103 and the housing aperture 106 are substantially aligned with each other in the x-y plane.

During operation of the assembly 100, the autofocus carrier 104 can move up and down, e.g., in the z-direction, within the housing aperture 106. The autofocus carrier 104 can support an optical lens, e.g., a camera lens. For example, the camera lens can be mounted on the autofocus carrier 104 such that the lens spans across the carrier aperture 103. The autofocus carrier 104 can move the lens up and down in the z-direction to adjust a focus of the camera.

The assembly 100 also includes a first frame 110 and a second frame 120. The assembly 100 includes a sensor coupled to the second frame 120. During operation of the sensor-stabilization assembly 100, the housing 102 remains rigid, or substantially stationary, relative to the electronic device. The autofocus carrier 104, the first frame 110, and the second frame 120 can each be moveable relative to the housing 102 and relative to the electronic device.

The assembly also includes an assembly base 136 that is nonmoving relative to the housing 102. The assembly base 136 supports a base circuit board for generating control signals for at least a portion of the assembly 100. The base circuit board can be coupled to an underside of the assembly base 136. An autofocus circuit board 116 electrically connects the autofocus carrier 104 to the base circuit board supported by the assembly base 136. The autofocus circuit board 116 can be, for example, a flexible printed circuit board (FPCB).

FIG. 1 shows the assembly 100 with each of the first frame 110 and the second frame 120 in a centered position. The centered position can be a resting position for the assembly 100, e.g., a position of the assembly when no current is applied to drive the position of the first frame or the second frame. In the centered position, the edges of the housing 102, the first frame 110, and the second frame 120 can be substantially aligned in the z-direction.

Figure 2:
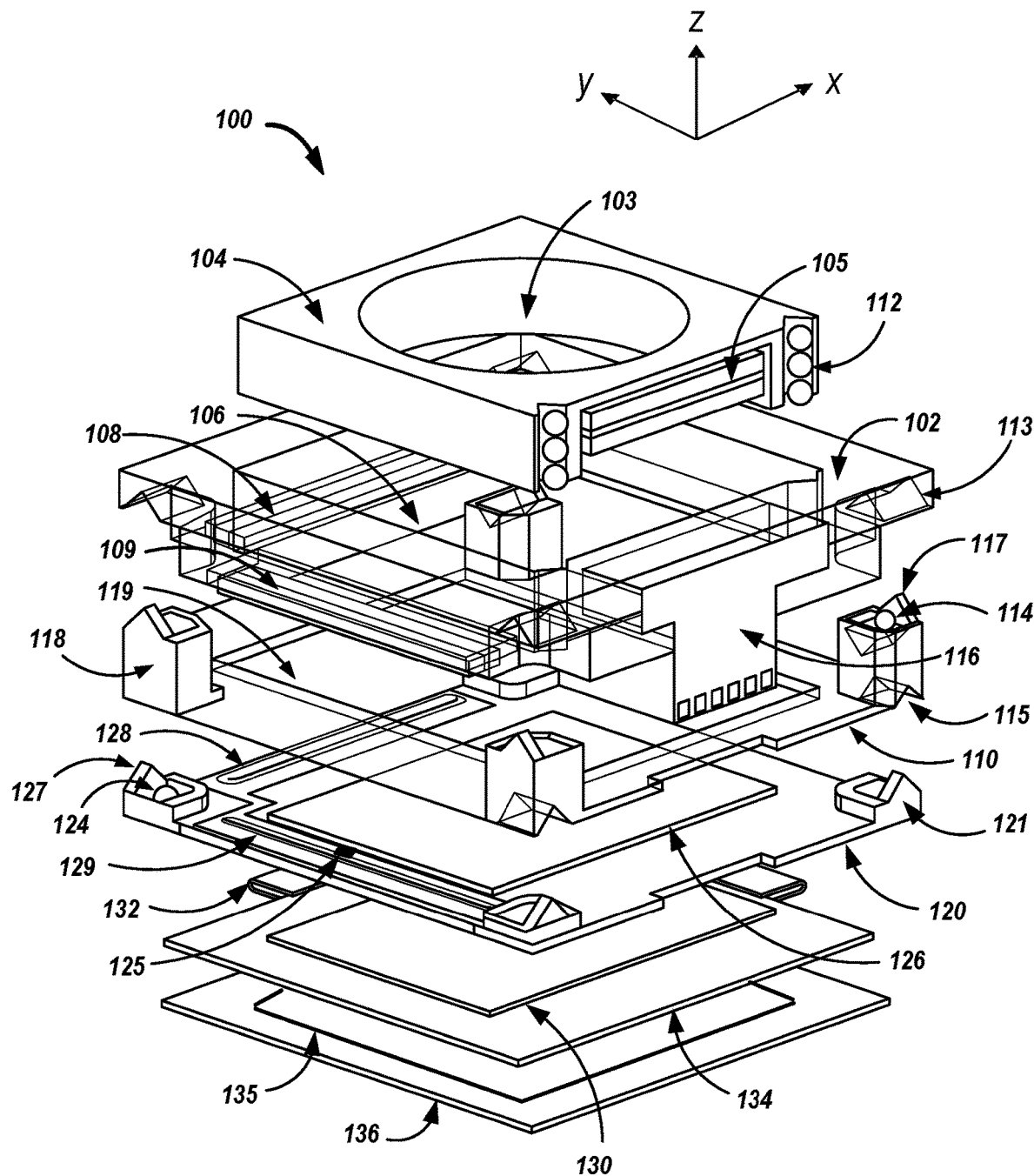
FIG. 2 is an exploded view of the sensor-stabilization assembly of FIG. 1.

FIG. 2 is an exploded view of the sensor-stabilization assembly of FIG. 1. Referring to FIG. 2, during operation of the assembly 100, light passes through the lens, through the housing aperture 106 and the carrier aperture 103, through a first frame aperture 119, through a filter 126, and is captured by a sensor 130. The sensor 130 can be, for example, an image sensor. The sensor 130 can be nonmoving relative to the second frame 120 of the assembly.

The autofocus carrier 104 supports a bipolar autofocus magnet 105. The autofocus circuit board 116 includes an autofocus coil and an autofocus Hall sensor supported by the inner side of the autofocus circuit board 116. The autofocus magnet 105 is substantially aligned with the autofocus coil and with the autofocus Hall sensor in the x-y plane.

The autofocus coil and the autofocus magnet 105 can electromagnetically interact to drive movement of the autofocus carrier 104 up and down in the z-direction. For example, current flowing through the autofocus coil in a first direction can induce a magnetic field that electromagnetically interacts with the autofocus magnet 105 to cause the autofocus carrier 104 to move upward, while current flowing through the autofocus coil in a second direction opposite the first direction can induce a magnetic field that electromagnetically interacts with the autofocus magnet 105 to cause the autofocus carrier 104 to move downward.

A Hall sensor, or Hall effect sensor, is a type of sensor that detects the presence and magnitude of a magnetic field using the Hall effect. The output voltage of a Hall sensor is directly proportional to the strength of the field. The autofocus Hall sensor can be used to measure displacement of the autofocus carrier 104 in the z-direction.

The autofocus circuit board 116 is coupled to the assembly base 136 and transmits autofocus driving signals between a base circuit board 135 and the autofocus coil. The autofocus circuit board 116 also transmits autofocus sensing signals between the autofocus Hall sensor and the base circuit board 135. The autofocus circuit board 116 can be soldered to the assembly base 136.

As the autofocus carrier 104 moves up and down, autofocus bearings 112 reduce friction between the autofocus carrier and housing 102. The autofocus bearings 112 can be located at each corner of the autofocus carrier 104. The autofocus bearings 112 can include rolling element bearings, e.g., ball bearings.

The housing 102 supports portions of electromagnetic assemblies that are used to drive the second frame 120 to move, e.g., by carrying, the sensor 130 in the x-direction and in the y-direction. For example, the assembly 100 includes a first electromagnetic assembly including a magnet 109 and a coil 129, and a second electromagnetic assembly including a magnet 108 and a coil 128.

The housing 102 includes a first portion of the first magnetic assembly, e.g., magnet 109. The housing 102 also includes a first portion of a second magnetic assembly, e.g., magnet 108. The magnet 108 is transverse to the magnet 109. The magnet 108 and the magnet 109 can be rigidly coupled to the housing 102. The housing aperture 106 can form a polygon, e.g., a rectangle, in the x-y plane. The magnet 108 and the magnet 109 can abut different sides of the housing aperture 106.

The underside of the housing 102 defines multiple first troughs 113 oriented along the first direction, e.g., the x-direction. In the example assembly 100, the underside of the housing 102 defines a first trough 113 at each corner of the housing 102.

The first frame 110 is movably mounted to an underside of the housing 102. The first frame 110 has an outer perimeter forming a polygonal shape, e.g., a rectangle, in the x-y plane. The first frame 110 has an inner perimeter that defines the first frame aperture 119. In some examples, the inner perimeter of the first frame 110 and the inner perimeter of the housing 102 have a same size and shape. The first frame aperture 119 is substantially aligned with the housing aperture 106 in the z-direction.

The first frame 110 includes multiple first guides 118. In the example assembly 100, the multiple first guides 118 include four first guides. The first frame 110 forms a first rectangle in the x-y plane, and each of the four first guides 118 is positioned at a respective corner of four corners of the first rectangle. The guides 118 of the first frame permit relative motion between the first frame 110 and the housing 102 along the x-direction. The guides 118 can prohibit relative motion between the first frame 110 and the housing along 102 the y-direction.

Each of the multiple first guides 118 includes a first protrusion 117 extending from a top side of the first frame 110. The first protrusion 117 extends into a corresponding first trough 113. In some examples, the multiple first troughs 113 each define a first wedge shape, and a shape of the first protrusion 117 of each of the multiple first guides 118 conforms with the first wedge shape defined by the corresponding first trough 113. For example, the trough 113 has a shape similar to a wedge or a triangular prism. The first protrusion 117 has a substantially wedge-like or triangular shape. The first protrusion 117 conforms with the shape of the trough 113 such that the first protrusion 117 fits into the trough 113 with minimal gaps between edges of the first protrusion 117 and sides of the trough 113.

The multiple first guides 118 can each include a rolling-element bearing. The rolling element bearing can include a rolling element such as a first ball 114. The first ball 114 reduces friction between the housing 102 and the first frame 110. During operation of the assembly 100, the first frame 110 can move side-to-side in the x-direction relative to the housing 102. As the first frame 110 moves side-to-side, the first protrusion 117 slides along the trough 113 in the x-direction. The first ball 114 rolls to reduce friction between the housing 102 and the first frame 110.

The underside of the first frame 110 defines multiple second troughs 115 oriented along the second direction, e.g., the y-direction. In the example assembly 100, the underside of the first frame 110 defines a second trough 115 at each corner of the first frame 110.

The second frame 120 is movably mounted to an underside of the first frame 110. The second frame 120 has an outer perimeter forming a polygonal shape, e.g., a rectangle, in the x-y plane. In some examples, the outer perimeter of the first frame 110 and the outer perimeter of the second frame have a same size and shape.

The second frame 120 includes multiple second guides 121. In the example assembly 100, the multiple second guides 121 include four second guides 121. The second frame 120 forms a rectangle in the x-y plane, and each of the four second guides 121 is positioned at a respective corner of four corners of the rectangle. The guides 121 of the second frame 120 permit relative motion between the second frame 120 and the first frame 110 along the y-direction. The guides 118 can prohibit relative motion between the second frame 120 and the first frame 110 along the x-direction.

Each of the multiple second guides 121 includes a second protrusion 127 extending from a top side of the second frame 120. The second protrusion 127 extends into a corresponding second trough 115. In some examples, the multiple second troughs 115 each define a second wedge shape, and a shape of the second protrusion 127 of each of the multiple second guides 121 conforms with the second wedge shape defined by the corresponding second trough 115. For example, the trough 115 has a shape similar to a wedge or a triangular prism. The second protrusion 127 has a substantially wedge-like or triangular shape. The second protrusion 127 conforms with the shape of the trough 115 such that the second protrusion 127 fits into the trough 115 with minimal gaps between edges of the second protrusion 127 and sides of the trough 115.

The multiple second guides 121 can each include a rolling-element bearing. The rolling element bearing can include a rolling element such as a second ball 124. The second ball 124 reduces friction between the first frame 110 and the second frame 120. During operation of the assembly 100, the second frame 120 can move side-to-side in the y-direction relative to the first frame 110. As the second frame 120 moves side-to-side, the second protrusion 127 slides along the trough 115 in the y-direction. The second ball 124 rolls to reduce friction between the first frame 110 and the second frame 120.

The second frame 120 supports portions of the electromagnetic assemblies that are used to drive the second frame 120 to move the sensor 130 in the x-direction and the y-direction. For example, the second frame 120 includes a second portion of the first electromagnetic assembly, e.g., coil 129. The second frame 120 also includes a second portion of the second electromagnetic assembly, e.g., coil 128. The coil 128 and the coil 129 can be rigidly coupled to the second frame 120. The second frame 120 can form a polygon, e.g., a rectangle, in the x-y plane. The coil 128 and the coil 129 can abut different sides of the second frame 120.

The coil 128 and the coil 129 each form at least one loop (potentially many loops) in the x-y plane. Each loop has a longer dimension and a shorter dimension. The longer dimension of the coil 128 is transverse to the longer dimension of the coil 129. For example, the longer dimension of the coil 128 extends in the x-direction, and the longer dimension of the coil 129 extends in the y-direction.

[1] The coil 129 is adapted to electromagnetically interact with the magnet 109 when the first electromagnetic assembly is energized to cause both of the first frame 110 and the second frame 120 to move relative to the housing along the x-direction. For example, when the first electromagnetic assembly is energized, the coil 129 interacts with the magnet 109 to cause the first frame 110 and the second frame 120 to move in tandem along the x-direction.

The coil 128 is adapted to electromagnetically interact with the magnet 108 when the second electromagnetic assembly is energized to cause the second frame 120 to move relative to both the first frame 110 and the housing 102 along the y-direction.

In some examples, the second frame supports multiple Hall sensors. A first Hall sensor (not shown) can be positioned adjacent to the coil 128. A second Hall sensor 125 can be positioned adjacent to the coil 129. The first Hall sensor can be used for measuring displacement of the second frame 120 along the y-direction. The second Hall sensor 125 can be used for measuring displacement of the second frame 120 along the x-direction. The Hall sensors can output a voltage measurement proportional to the displacement of the second frame 120. The base circuit board 135 can then adjust the current to the coils 128, 129, based on the voltage output from the respective Hall sensors.

The sensor 130 can be supported by a sensor base 134. For example, the sensor base 134 can be attached to an underside of the sensor 130 by an adhesive material. The sensor base 134 is mechanically coupled to the second frame 120. The sensor base 134 can be mechanically coupled to the second frame 120, e.g., by an adhesive material, by soldering, etc. In some examples, the sensor 130 is positioned between the second frame 120 and the sensor base 134 in the z-direction.

The sensor 130 has an outer perimeter that forms a rectangle in the x-y plane. The size of the outer perimeter of the sensor 130 in the x-y plane can be less than the size of the outer perimeter of the housing 102, less than the size of the outer perimeter of the first frame 110, less than the size of the outer perimeter of the second frame 120, or any combination of these. In some examples, the outer perimeter of the sensor 130 has a same size and shape as the inner perimeter of the first frame 110. The sensor 130 can be an image sensor having a diameter of, e.g., 40 mm or less, 16 mm or less, 10 mm or less, etc.

The sensor 130 can capture light passing through the housing aperture 106 and the first frame aperture 119, e.g., approximately along the z-direction. The second frame 120 supports a filter 126. The filter 126 is aligned with the housing aperture 106 and the first frame aperture 119 in the z-direction. The filter 126 can be a blue filter, e.g., blue glass filter. The blue glass filter can filter out light of certain wavelengths, e.g., infrared light. The blue glass filter can permit transmittance of red-green-blue light to the sensor 130.

The sensor 130 is connected to a fixed circuit board, e.g., the base circuit board 135, with a flexible conductor 132. The flexible conductor 132 can be, for example, an FPCB, a conductive wire, etc. The sensor 130 can receive electrical signals from the base circuit board 135 over the flexible conductor 132. The sensor 130 can transmit image sensor signals to the base circuit board 135 through the flexible conductor 132.

In some examples, the flexible conductor 132 can be connected to two adjacent sides of the sensor 130. For example, the flexible conductor 132 can be connected to a first side of the sensor 130 in order to transmit signals routed from sensor vertical connection pads, and can be connected to a second side of the sensor 130 in order to transmit signals routed from sensor horizontal connection pads.

The fixed circuit board can be fixed with respect to the housing. For example, the fixed circuit board can be supported by the assembly base 136. Transmitting signals between the sensor 130 and the fixed circuit board over the flexible conductor 132 can allow for movement of the sensor 130 with respect to the fixed circuit board. For example, the flexible conductor 132 can flex, or bend, to allow for movement of the sensor 130 in the x-direction, the y-direction, or both.

The assembly base 136 can support the fixed circuit board. The assembly base 136 can also protect moving portions of the assembly 100, e.g., the sensor 130, the first frame 110, and the second frame 120.

Figure 3A:
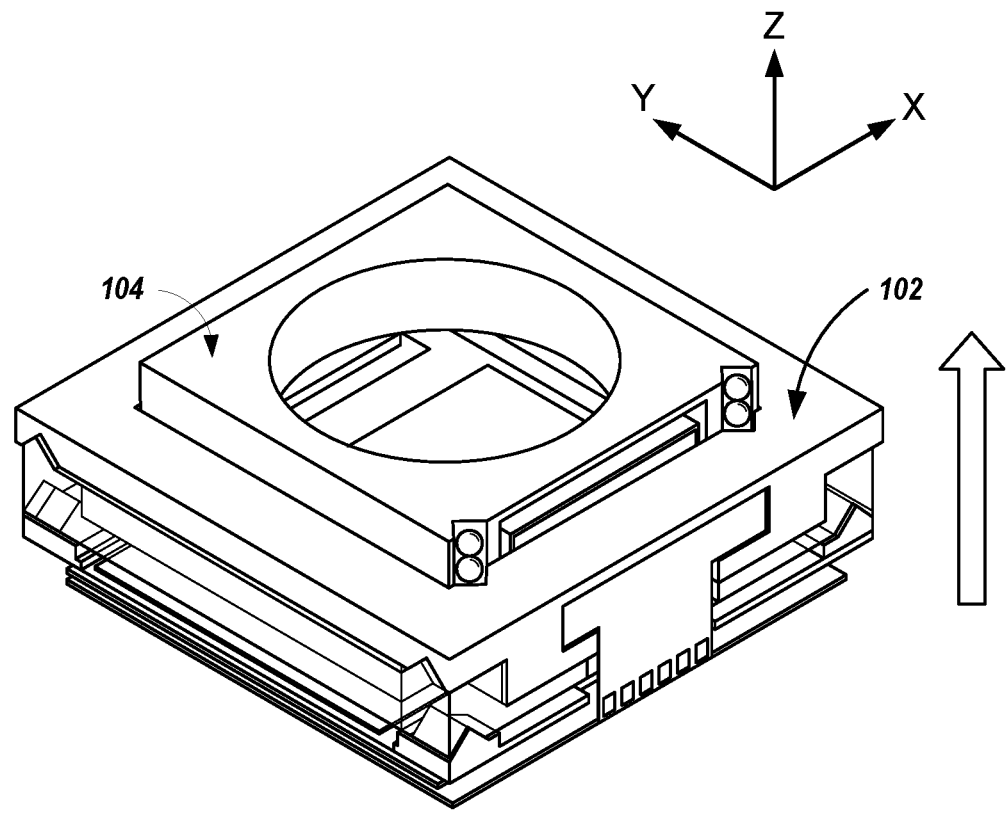
FIGS. 3A and 3B are perspective views of an example sensor-stabilization assembly with an autofocus carrier moving up and down relative to a housing of the assembly.
Figure 3B:
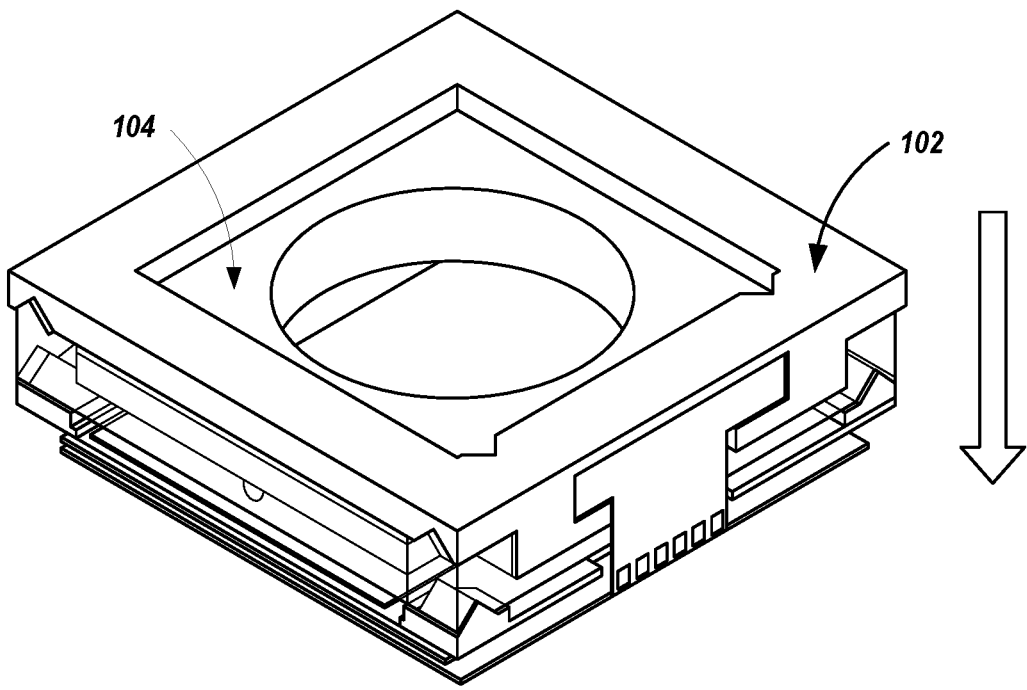

FIGS. 3A and 3B are perspective views of an example sensor-stabilization assembly with an autofocus carrier moving up and down.

Referring to FIG. 3A, when current is applied to the autofocus coil, the electromagnetic field generated by the autofocus coil interacts with the autofocus magnet 105 to exert a force on the autofocus carrier 104 in the z-direction. The force exerted on the autofocus carrier 104 in the z-direction causes the autofocus carrier 104 to move relative to the housing 102 in the z-direction.

Changing the direction of current flow through the autofocus coil can reverse movement direction of the autofocus carrier 104. For example, current flowing in a first direction, e.g., clockwise, can cause the autofocus carrier 104 to move up, as shown in FIG. 3A. Changing the current to flow in a second direction, e.g., counterclockwise, can cause the autofocus carrier 104 to move to down, as shown in FIG. 3B.

Figure 4A:
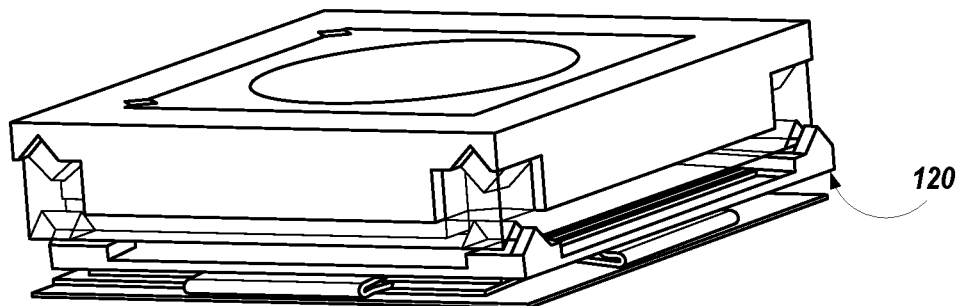
FIGS. 4A and 4B are perspective views of an example sensor-stabilization assembly with a second frame moving side to side relative to a first frame and a housing of the assembly.
Figure 4B:
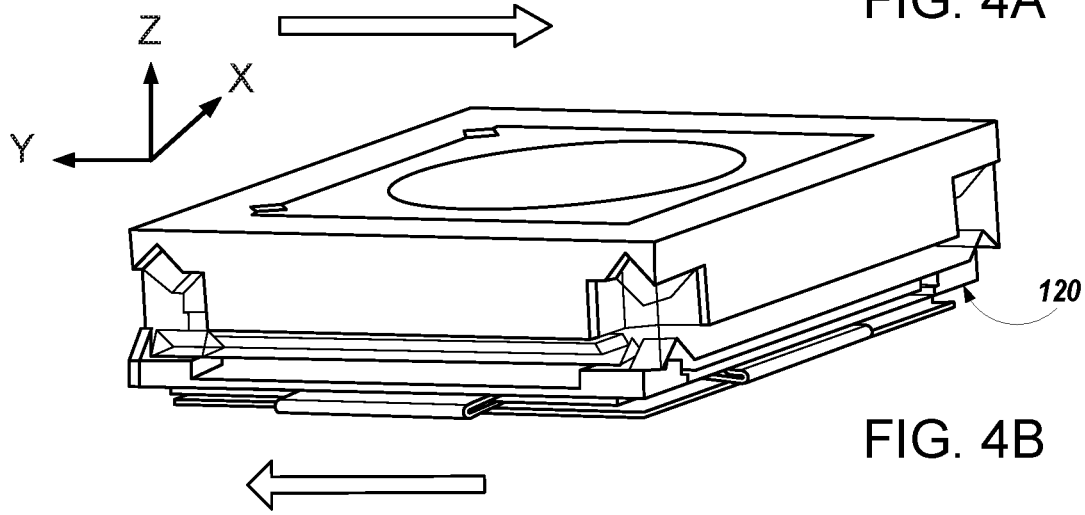

FIGS. 4A and 4B are perspective views of an example sensor-stabilization assembly with a second frame moving side to side relative to a first frame and a housing of the assembly. A closed-loop control system includes adjusting current through coils based on measurements from Hall sensors of the assembly.

Referring to FIG. 4A, when current is applied to coil 128, the electromagnetic field generated by the coil 128 interacts with the magnet 108 to exert a force on the second frame 120 in the y-direction. The guides 121 of the second frame 120 permit relative motion between the second frame 120 and the first frame 110 in the y-direction. Thus, the force exerted on the second frame 120 in the y-direction causes the second frame 120 to move relative to the first frame 110 and the housing 102 in the y-direction. The first frame 110 and the housing 102 remain stationary.

Changing the direction of current flow through the coil 128 can reverse movement direction of the second frame 120. For example, current flowing in a first direction, e.g., clockwise, can cause the second frame 120 to move to the right, as shown in FIG. 4A. Changing the current to flow in a second direction, e.g., counterclockwise, can cause the second frame 120 to move to the left, as shown in FIG. 4B.

Changing current amplitude can adjust an amount of movement of the second frame 120. For example, a higher current amplitude flowing through the coil 128 can cause the second frame 120 to move a greater distance in the y-direction away from center compared to a lower current amplitude. In an example, the fixed circuit board can apply a current to the coil 128 of 10.0 milliamps (mA). The current applied to the coil 128 can cause the second frame 120 to move to a first position that is to the right of center in the y-direction. The fixed circuit board can then increase the current to the coil 128 to 11.0 mA. The increase of current to the coil 128 can cause the second frame 120 to move to the right in the y-direction, such that the second frame 120 moves to a second position that is further to the right compared to the first position.

In some examples, the fixed circuit board can apply a constant current to the coil 128 in order to maintain a steady position of the sensor 130 relative to the housing. In some examples, the fixed circuit board can adjust the current to the coil 128 based on movement of the housing 102. For example, to counteract movement of the housing 102 to the left, the fixed circuit board can apply a current to the coil 128 to cause the sensor 130 to move to the left. By moving the sensor 130 to the left, an object in the field of view of the sensor can be maintained in a same or similar position relative to the sensor 130, compared to the position of the object relative to the sensor prior to movement of the housing 102. This can improve image quality by reducing motion blur in the images when housing movement occurs.

In some examples, the fixed circuit board can increase a current to the coil 128 to overcome static and rotational friction of the rolling element bearings in order to move the sensor 130 in the y-direction. Once the sensor 130 moves to a desired position in the y-direction, the fixed circuit board can reduce the current to the coil 128 in order to maintain the sensor in a steady position relative to the housing 102.

Figure 5A:
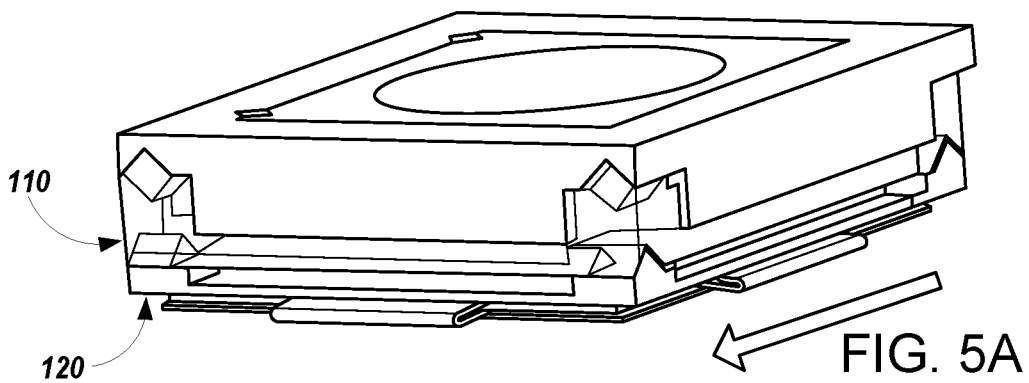
FIGS. 5A and 5B are perspective views of an example sensor-stabilization assembly with a first frame and a second frame moving side to side relative to a housing of the assembly.
Figure 5B:
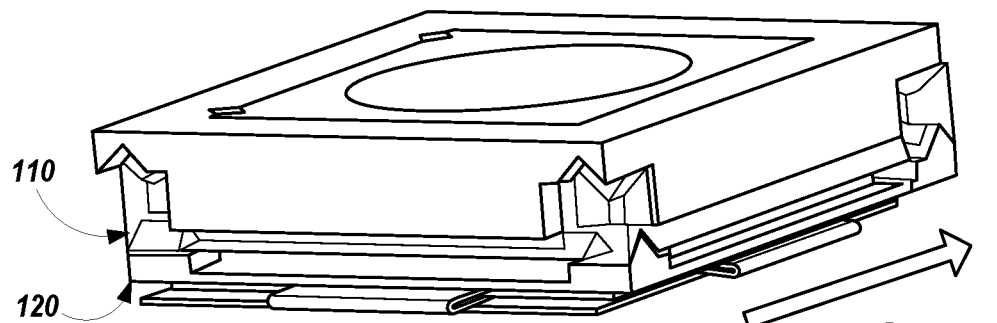

FIGS. 5A and 5B are perspective views of an example sensor-stabilization assembly with a first frame and a second frame moving side to side relative to a housing of the assembly. Referring to FIG. 5A, when current is applied to coil 129, the electromagnetic field generated by the coil 129 interacts with the magnet 109 to exert a force on the second frame 120 in the x-direction. The guides 121 of the second frame 120 prohibit relative motion between the second frame and the first frame in the x-direction. The guides 118 of the first frame permit relative motion between the first frame 110 and the housing 102 in the x-direction. Thus, the force exerted on the second frame 120 in the x-direction causes both the first frame 110 and the second frame 120 to move relative to the housing 102 in the x-direction. The first frame 110 and the second frame 120 move in tandem along the x-direction. For example, the first frame 110 and the second frame 120 can each move a same distance along the x-direction.

Changing the direction of current flow through the coil 129 can reverse movement direction of the first frame 110 and the second frame 120. For example, current flowing in a first direction, e.g., clockwise, can cause the first frame 110 and the second frame 120 to move outward in the x-direction, as shown in FIG. 5A. Changing the current to flow in a second direction, e.g., counterclockwise, can cause the first frame 110 and the second frame 120 to move inward in the x-direction, as shown in FIG. 5B.

The displacement of the first frame 110 and the second frame 120 in the x-direction can be controlled by adjusting current amplitude, as described above with reference to FIGS. 4A and 4B. For example, the fixed circuit board can adjust current to the coil 129 in order to control movement of the sensor in the x-direction. The fixed circuit board can apply current to the coil 128, to the coil 129, to both, or to neither. In some examples, the fixed circuit board can apply current to both the coil 129 and the coil 128 in order to counteract movement of the housing in multiple directions.

FIG. 6 shows an example flow diagram of a process 600 for operating a sensor-stabilization assembly. The process 600 includes moving a sensor coupled to a second frame of an assembly in a first direction by energizing a first magnetic assembly to cause both of the second frame and a first frame to move relative to a housing of the assembly along the first direction (602). For example, the sensor 130 is coupled to the second frame 120 of the assembly 100. The sensor 130 can be moved in a first direction, e.g., an x-direction, by energizing a first magnetic assembly including the magnet 109 and the coil 129. Energizing the first magnetic assembly causes the first frame 110 and the second frame 120 to move in tandem relative to the housing 102 along the x-direction, as shown in FIGS. 5A and 5B.

The process 600 includes moving the sensor coupled to the second frame of the assembly in a second direction transverse to the first direction by energizing a second magnetic assembly to cause the second frame to move relative to both of the first frame and the housing along the second direction (604). For example, the sensor 130 is coupled to the second frame 120 of the assembly 100. The sensor 130 can be moved in a second direction, e.g., a y-direction, by energizing a second magnetic assembly including the magnet 108 and the coil 128. Energizing the second magnetic assembly causes the second frame 120 to move independently relative to the first frame 110 and the housing 102 along the y-direction, as shown in FIGS. 4A and 4B.

While the foregoing figures cover a specific embodiment of a sensor-stabilization assembly i.e., sensor-stabilization assembly 100, more generally the principles embodied in this example can be applied in other designs too. For example, while sensor-stabilization assembly 100 has a substantially square footprint (i.e., in the x-y plane), other shapes are possible, such as substantially rectangular, oval, or round.

The magnets of sensor-stabilization assembly 100 can be an iron magnet, a neodymium magnet, or a ferrite magnet, such as one composed of iron and nickel. In some embodiments, one or more of the magnets of sensor-stabilization assembly 100 can be replaced by an electromagnet. In some embodiments, sensor-stabilization assembly 100 can include high permeability materials.

In general, the sensor-stabilization assemblies described above can be used in a variety of applications. For example, in some embodiments, sensor-stabilization assembly 100 can be used to stabilize an image sensor of a camera of an electronic device. Such assemblies can be integrated into a mobile device, such as a mobile phone. For example, referring to FIG. 7, a mobile device 700 includes a device chassis 702 and a touch panel display 704 including a flat panel display (e.g., an OLED or LCD display panel) that integrates a panel audio loudspeaker. Mobile device 700 interfaces with a user in a variety of ways, including by displaying images and receiving touch input via touch panel display 704. Typically, a mobile device has a depth (in the z-direction) of approximately 10 mm or less, a width (in the x-direction) of 60 mm to 80 mm (e.g., 68 mm to 72 mm), and a height (in the y-direction) of 100 mm to 160 mm (e.g., 138 mm to 144 mm). Mobile phones are particularly challenging for stabilization as they are portable devices that are subject to a wide variety of environmental conditions and user behavior during image capture. A robust image stabilization system can increase the user experience and satisfaction.

Figure 7:
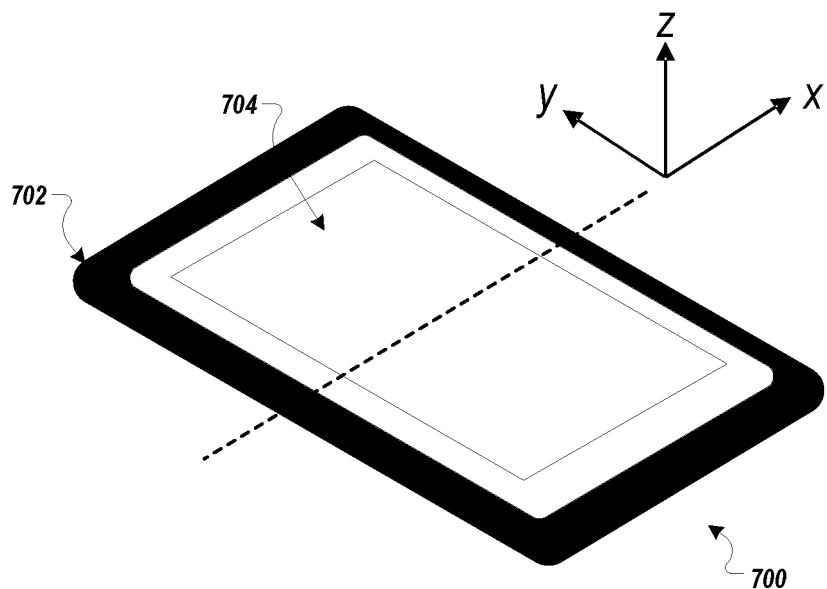
FIG. 7 is a perspective view of an embodiment of a mobile device.
Figure 8:
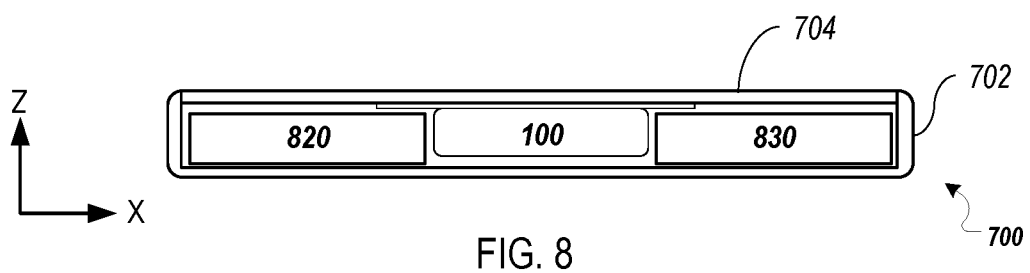
FIG. 8 is a schematic cross-sectional view of the mobile device of FIG. 7.

FIG. 7 also shows a dashed line that corresponds to the cross-sectional direction shown in FIG. 8. Referring to FIG. 8, a cross-section of mobile device 700 illustrates device chassis 702 and touch panel display 704. Device chassis 702 has a depth measured along the z-direction and a width measured along the x-direction. Device chassis 702 also has a back panel, which is formed by the portion of device chassis 702 that extends primarily in the x-y plane. Mobile device 700 includes sensor-stabilization assembly 100, which is housed behind display 704 in chassis 702 and attached to the back side of display 704. For example, a PSA can attach sensor-stabilization assembly 100 to display 704. Generally, sensor-stabilization assembly 100 is sized to fit within a volume constrained by other components housed in the chassis, including an electronic control module 820 and a battery 830.

In general, the disclosed actuators are controlled by an electronic control module, e.g., electronic control module 820. In general, electronic control modules are composed of one or more electronic components that receive input from one or more sensors and/or signal receivers of the mobile phone, process the input, and generate and deliver signal waveforms that control operations of the sensor-stabilization assembly 100.

Figure 9:
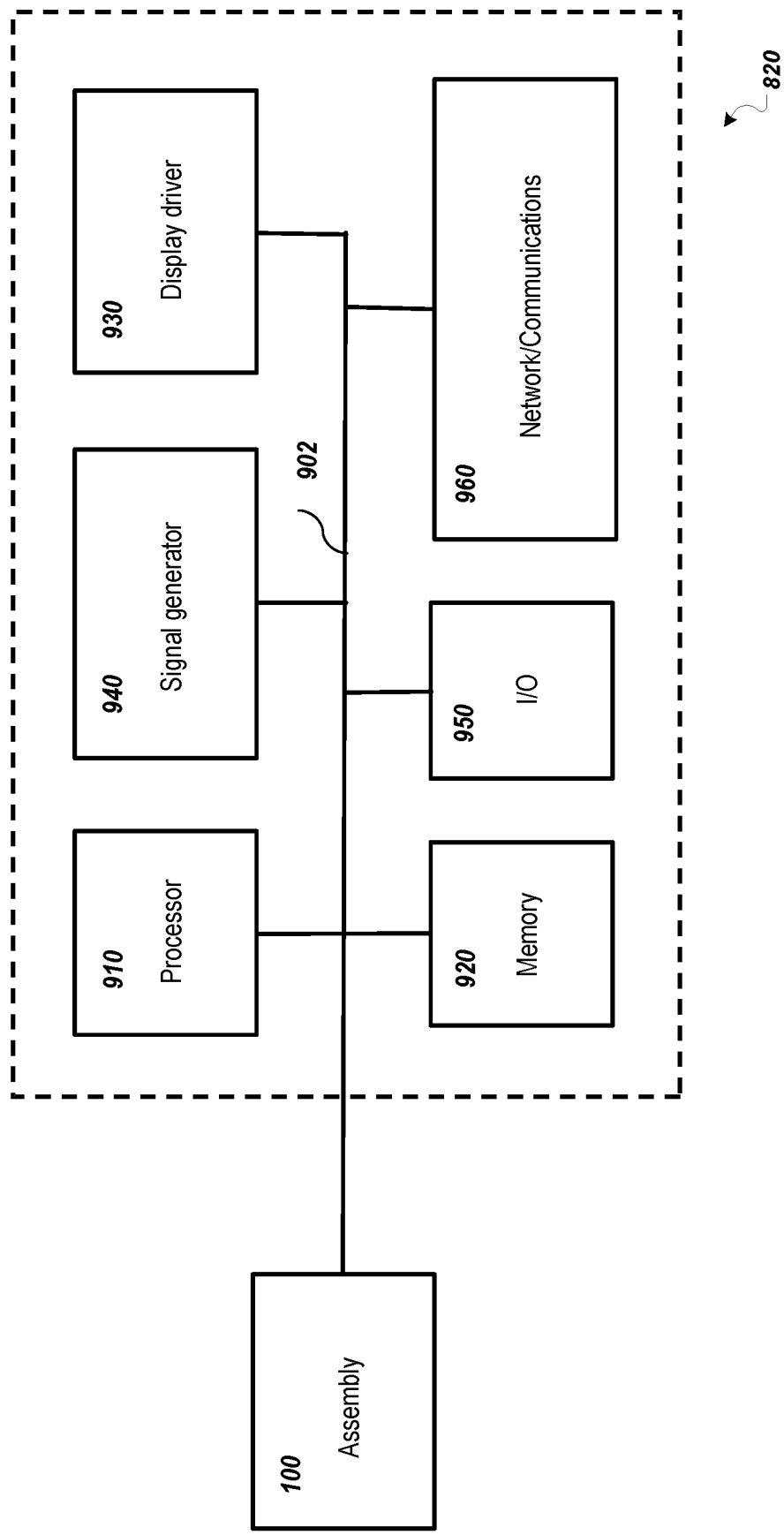
FIG. 9 is a schematic diagram of an embodiment of an electronic control module for a mobile device.

Referring to FIG. 9, an exemplary electronic control module 820 of a mobile device, such as mobile device 700, includes a processor 910, memory 920, a display driver 930, a signal generator 940, an input/output (I/O) module 950, and a network/communications module 960. These components are in electrical communication with one another (e.g., via a signal bus 902) and with sensor-stabilization assembly 100.

Processor 910 may be implemented as any electronic device capable of processing, receiving, or transmitting data or instructions. For example, processor 910 can be a microprocessor, a central processing unit (CPU), an application-specific integrated circuit (ASIC), a digital signal processor (DSP), or combinations of such devices.

Memory 920 has various instructions, computer programs or other data stored thereon. The instructions or computer programs may be configured to perform one or more of the operations or functions described with respect to the mobile device. For example, the instructions may be configured to control or coordinate the operation of the device's display via display driver 930, signal generator 940, one or more components of I/O module 950, one or more communication channels accessible via network/communications module 960, one or more sensors (e.g., biometric sensors, temperature sensors, accelerometers, optical sensors, barometric sensors, moisture sensors and so on), and/or sensor-stabilization assembly 100.

Signal generator 940 is configured to produce AC waveforms of varying amplitudes, frequency, and/or pulse profiles suitable for sensor-stabilization assembly 100. Although depicted as a separate component, in some embodiments, signal generator 940 can be part of processor 910. In some embodiments, signal generator 940 can include an amplifier, e.g., as an integral or separate component thereof.

Memory 920 can store electronic data that can be used by the mobile device. For example, memory 920 can store electrical data or content such as, for example, audio and video files, documents and applications, device settings and user preferences, timing and control signals or data for the various modules, data structures or databases, and so on. Memory 920 may also store instructions for recreating the various types of waveforms that may be used by signal generator 940 to generate signals for sensor-stabilization assembly 100. Memory 920 may be any type of memory such as, for example, random access memory, read-only memory, Flash memory, removable memory, or other types of storage elements, or combinations of such devices.

As briefly discussed above, electronic control module 820 may include various input and output components represented in FIG. 9 as I/O module 950. Although the components of I/O module 950 are represented as a single item in FIG. 9, the mobile device may include a number of different input components, including buttons, microphones, switches, and dials for accepting user input. In some embodiments, the components of I/O module 950 may include one or more touch sensor and/or force sensors. For example, the mobile device's display may include one or more touch sensors and/or one or more force sensors that enable a user to provide input to the mobile device.

Each of the components of I/O module 950 may include specialized circuitry for generating signals or data. In some cases, the components may produce or provide feedback for application-specific input that corresponds to a prompt or user interface object presented on the display.

As noted above, network/communications module 960 includes one or more communication channels. These communication channels can include one or more wireless interfaces that provide communications between processor 910 and an external device or other electronic device. In general, the communication channels may be configured to transmit and receive data and/or signals that may be interpreted by instructions executed on processor 910. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, one or more of the communication channels of network/communications module 960 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the mobile device 700 to a mobile phone for output on that device and vice versa. Similarly, the network/communications module 960 may be configured to receive input provided on another device to control the mobile device. For example, an audible alert, visual notification, or haptic alert (or instructions therefor) may be transmitted from the external device to the mobile device for presentation.

The actuator technology disclosed herein can be used in image sensor systems, e.g., camera systems. The camera systems can be integrated with a panel. The panel may be a display system, for example based on OLED or LCD technology. The panel may be part of a smartphone, tablet computer, or wearable devices (e.g., smartwatch or head-mounted device, such as smart glasses).

Other embodiments are in the following claims.

What is claimed is:

1. A sensor-stabilization assembly, comprising:
    a housing that includes a first portion of a first electromagnetic assembly and a first portion of a second electromagnetic assembly, and that defines a housing aperture;
    a first frame that is movably mounted to an underside of the housing and that has multiple first guides that permit relative motion between the first frame and the housing along a first direction, the first frame defining a first frame aperture;
    a second frame that is movably mounted to an underside of the first frame and that has multiple second guides that permit relative motion between the second frame and the first frame along a second direction that is transverse to the first direction, wherein:

the second frame includes a second portion of the first electromagnetic assembly that is adapted to electromagnetically interact with the first portion of the first electromagnetic assembly when the first electromagnetic assembly is energized to cause both of the first frame and the second frame to move relative to the housing along the first direction; and the second frame includes a second portion of the second electromagnetic assembly that is adapted to electromagnetically interact with the first portion of the second electromagnetic assembly when the second electromagnetic assembly is energized to cause the second frame to move relative to both of the first frame and the housing along the second direction; and a sensor coupled to the second frame, the sensor being configured to move in the first and second directions with the second frame and capture light passing through the housing aperture and the first frame aperture.

2. The assembly of claim 1, wherein:
the underside of the housing defines multiple first troughs oriented along the first direction; and
each of the multiple first guides comprises a first protrusion extending from a top side of the first frame into a corresponding first trough of the multiple first troughs defined by the underside of the housing.

3. The assembly of claim 2, wherein the multiple first troughs each define a first wedge shape, and a shape of the first protrusion of each of the multiple first guides conforms with the first wedge shape defined by the corresponding first trough.

4. The assembly of claim 1, wherein:
the underside of the first frame defines multiple second troughs oriented along the second direction; and
each of the multiple second guides comprises a second protrusion extending from a top side of the second frame into a corresponding second trough of the multiple second troughs defined by the underside of the first frame.

5. The assembly of claim 4, wherein the multiple second troughs each define a second wedge shape, and a shape of the second protrusion of each of the multiple second guides conforms with the second wedge shape defined by the corresponding second trough.

6. The assembly of claim 1, wherein the multiple first guides prohibit relative motion between the first frame and the housing along the second direction.

7. The assembly of claim 1, wherein the multiple second guides prohibit relative motion between the second frame and the first frame along the first direction.

8. The assembly of claim 1, wherein:
an outer perimeter of the first frame forms a first rectangle in a plane defined by the first direction and the second direction;
the multiple first guides include four first guides; and
each of the four first guides is positioned at a respective corner of four corners of the first rectangle.

9. The assembly of claim 1, wherein:
an outer perimeter of the second frame forms a second rectangle in a plane defined by the first direction and the second direction;
the multiple second guides include four second guides; and
each of the four second guides is positioned at a respective corner of four corners of the second rectangle.

10. The assembly of claim 1, wherein an outer perimeter of the first frame and an outer perimeter of the second frame have a same size and shape.

11. The assembly of claim 1, wherein:
the housing aperture is defined by an inner perimeter of the housing;
the first frame aperture is defined by an inner perimeter of the first frame; and
the inner perimeter of the housing and the inner perimeter of the first frame have a same size and shape.

12. The assembly of claim 1, wherein:
the first portion of the first electromagnetic assembly and the first portion of the second electromagnetic assembly each comprise a magnet; and
the second portion of the first electromagnetic assembly and the second portion of the second electromagnetic assembly each comprise a coil.

13. The assembly of claim 1, wherein:
the first portion of the first electromagnetic assembly is transverse to the first portion of the second electromagnetic assembly; and
the second portion of the first electromagnetic assembly is transverse to the second portion of the second electromagnetic assembly.

14. The assembly of claim 1, wherein:
the housing aperture forms a rectangle in a plane defined by the first direction and the second direction;
the first portion of the first electromagnetic assembly and the first portion of the second electromagnetic assembly abut different sides of the housing aperture;
an outer perimeter of the second frame forms a rectangle in a plane defined by the first direction and the second direction; and
the second portion of the first electromagnetic assembly and the second portion of the second electromagnetic assembly abut different sides of the second frame.

15. The assembly of claim 1, wherein each of the multiple first guides and each of the multiple second guides includes a rolling-element bearing.

16. The assembly of claim 1, wherein the housing supports an autofocus carrier that moves up and down along a third direction that is transverse to the first direction and the second direction.

17. The assembly of claim 1, wherein the assembly is located inside of an electronic device and the housing is nonmoving relative to the electronic device.

18. The assembly of claim 1, wherein:
the sensor is connected to a fixed circuit board with a flexible conductor to receive electrical signals from the fixed circuit board over the flexible conductor; and
the fixed circuit board is fixed with respect to the housing.

19. The assembly of claim 1, wherein the sensor comprises an image sensor.

20. A sensor-stabilization assembly, comprising:
a housing that includes a first portion of a first electromagnetic assembly and a first portion of a second electromagnetic assembly, and that defines a housing aperture;
a first frame that is movably mounted to an underside of the housing and that has multiple first guides that permit relative motion between the first frame and the housing along a first direction, the first frame defining a first frame aperture;
a second frame that is movably mounted to an underside of the first frame and that has multiple second guides that permit relative motion between the second frame and the first frame along a second direction that is transverse to the first direction, wherein:
an outer perimeter of the first frame forms a first rectangle in a plane defined by the first direction and the second direction, each of the multiple first guides being positioned at a respective corner of the first rectangle;
an outer perimeter of the second frame forms a second rectangle in the plane defined by the first direction and the second direction, each of the multiple second guides being positioned at a respective corner of the second rectangle;
the second frame includes a second portion of the first electromagnetic assembly that is adapted to electromagnetically interact with the first portion of the first electromagnetic assembly when the first electromagnetic assembly is energized to cause both of the first frame and the second frame to move relative to the housing along the first direction; and
the second frame includes a second portion of the second electromagnetic assembly that is adapted to electromagnetically interact with the first portion of the second electromagnetic assembly when the second electromagnetic assembly is energized to cause the second frame to move relative to both of the first frame and the housing along the second direction; and
a sensor coupled to the second frame, the sensor being configured to move in the first and second direction with the second frame and capture light passing through the housing aperture and the first frame aperture.

* * * * *